United States Patent [19]

Dieterich

[11] Patent Number: 4,528,513
[45] Date of Patent: Jul. 9, 1985

[54] DIGITAL FM RATIO DETECTOR WITH GAIN-CONTROLLED FILTER

[75] Inventor: Charles B. Dieterich, Princeton, N.J.

[73] Assignee: RCA Corporation, Princeton, N.J.

[21] Appl. No.: 488,595

[22] Filed: Apr. 25, 1983

[51] Int. Cl.$^3$ .............................................. H03D 1/00
[52] U.S. Cl. ................................... 329/145; 329/130; 329/132; 375/82
[58] Field of Search ............... 329/107, 129, 130, 131, 329/132, 133, 136, 145, 146, 170, 178; 375/80, 82, 98, 103

[56] References Cited

U.S. PATENT DOCUMENTS

| | | | |
|---|---|---|---|
| 3,355,669 | 11/1967 | Avins | 329/103 |
| 3,611,169 | 10/1971 | Hess et al. | 455/214 X |
| 3,746,997 | 7/1973 | Willett et al. | 375/80 |
| 3,927,378 | 12/1975 | Fjallbrant | 329/145 |
| 4,286,223 | 8/1981 | Shearer | 329/50 |
| 4,345,211 | 8/1982 | Longworth | 329/50 |
| 4,368,434 | 1/1983 | Miller et al. | 329/50 |

FOREIGN PATENT DOCUMENTS

| | | | |
|---|---|---|---|
| 41162 | 4/1978 | Japan | 329/145 |
| 2022954 | 12/1979 | United Kingdom . | |

OTHER PUBLICATIONS

Kongable, L. S., "Angle-Modulated Signals Suffer Less A-M Distortion", Electronics, v. 55, No. 4, (Feb. 24, 1982), pp. 123-125.
B. Gold, et al., *Digital Processing of Signals*, McGraw-Hill Book Co., 1969, Chapter 2, pp. 19-25, 36-43.
R. Karwoski, "Introduction to the Z Transform and its Derivation", TRW LSI Products, Sep. 1979, pp. 1-22.
L. Jackson, et al., "An Approach to the Implementation of Digital Filters", *IEEE Trans. on Audio Electroacoustics*, vol. AU-16, Sep. 1968, pp. 413-421 (reprint pp. 210-218).
F. Terman, *Radio Engineer's Handbook*, McGraw-Hill Book Co., 1943, Section 7-18, pp. 585-588.
W. Orr, *Radio Handbook*, 17th Edition, Editors and Engineers, Ltd., New Augusta, Ind., 1967, pp. 319-322.
D. DeMaw, et al., Ed., *The Radio Amateur's Handbook*, 56th Edition, American Radio Relay League, 1979, pp. 13-8 to 13-9.
F. Coupe, "Digital Frequency Discriminator", *Electronics Letters*, vol. 15, No. 16, Aug. 2, 1979, pp. 489-490.
P. Draheim, "Digitalisierung der Video-Signalverarbeitung", *Elektronik*, 10.21/22.1982, pp. 121-124 (with translation).
W. Demmer, et al., "Pipelining-Verfahren in der Digitalen Signalverarbeitung", *Elektronik*, 2.3/12.1982, pp. 73-77 (with translation).

*Primary Examiner*—Eugene R. LaRoche
*Assistant Examiner*—Robert J. Pascal
*Attorney, Agent, or Firm*—E. M. Whitacre; P. J. Rasmussen; C. A. Berard, Jr.

[57] ABSTRACT

A digital ratio detector for detecting digitized frequency-modulated (FM) signals develops sum and difference signals from input digital signals and from delayed representations thereof. The sum and difference signals are detected and further sum and difference signals are developed and are applied to respective lowpass digital filters having controllable gain. A gain control circuit develops a gain control signal which is applied to the digital lowpass filters to control the respective gains thereof so that the filtered digital signals produced by one of the digital filters includes digital representations of the deviations of the FM carrier.

22 Claims, 3 Drawing Figures

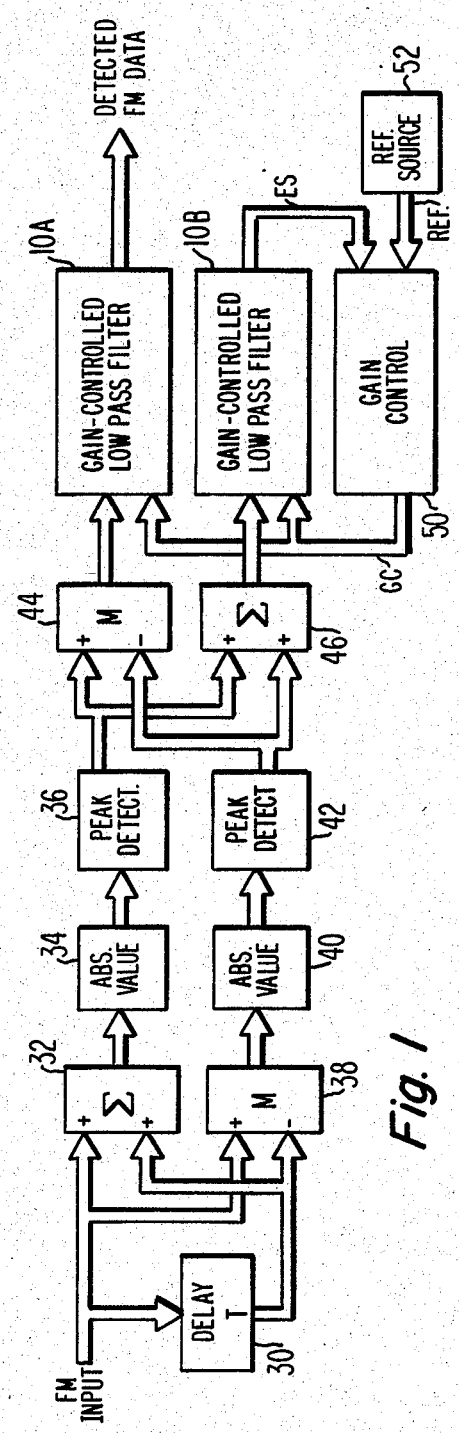
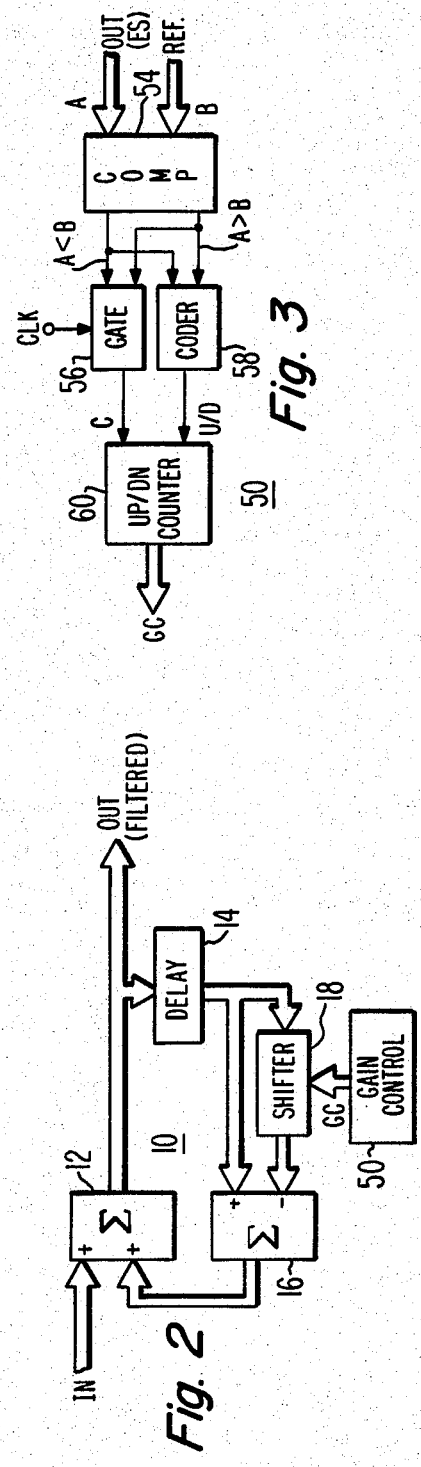
Fig. 1
Fig. 2
Fig. 3

DIGITAL FM RATIO DETECTOR WITH GAIN-CONTROLLED FILTER

The present invention relates to digital frequency modulation (FM) detectors and particularly to a digital FM ratio detector employing a gain-controlled filter.

FM detectors and discriminators are well known in the analog circuit arts. A typical arrangement is described in D. DeMaw et al., Editors, THE RADIO AMATEUR'S HANDBOOK, 56th Edition, American Radio Relay League, 1970, page 13-9. In the circuit of FIG. 17 thereof, for example, the coupled tuned circuit discriminator transformer develops a signal responsive to the ratio of the signals developed 90° out of phase in each tuned circuit which are peak detected by diodes 1N67A. Because the output signal depends on a ratio, the effects of carrier amplitude variations are balanced out. If one were to translate the known analog FM detectors into their digital equivalents, some arrangement would be needed to reduce the effects of carrier amplitude variation present on the digitized FM signal.

Amplitude limiting in the analog signal domain produces only higher frequency components which are easily removed by a lowpass filter. Amplitude limiting in the digital (sampling signal) domain produces aliasing signal components at sum and difference frequencies which are within the frequency range of interest. These undesirable aliasing signals can not be removed. Thus, digital amplitude limiting should be avoided.

A digital FM detector is described by F. Coupe, "Digital Frequency Discriminator", ELECTRONICS LETTERS, Vol. 15 No. 16, August 1979, pages 489-90. Coupe's arrangements require several digital multipliers as can be seen in FIGS. 1 and 2 thereof. Other digital FM demodulators, such as that shown by P. Draheim in "Digitalisierung der Video-Signalverarbeitung Beispiel: Video-Kassettenrecorder" *ELEKTRONIK*, Oct. 22, 1982, pages 121-24, Bild 4, require digital dividers. Digital multipliers and dividers are very complex circuits and require relatively large areas on integrated circuit chips and so it is desirable to avoid their use whenever possible.

To avoid those problems, the digital detector of the present invention comprises a device producing first and second detected digital signals representing the envelope and the product of the envelope and deviation of a digital input signal. Two controllable-gain digital filters receive the first and second detected digital signals, respectively, and receive a control signal developed by a control device in response to one of the first and second detected digital signals.

In the drawing:

FIG. 1 is a schematic diagram in block diagram form including an embodiment of the present invention; and FIGS. 2 and 3 are schematic diagrams in block diagram form of particular arrangements useful with the embodiment of FIG. 1.

In the drawing, broad arrows represent digital signal paths for multiple bit parallel digital signals, whereas line arrows represent single-bit digital signals or digital level signals.

The digital FM ratio detector of FIG. 1 receives digitized signals FM INPUT which are digitized samples representative of an information signal frequency modulated on a carrier signal. The FM INPUT signal is delayed by a predetermined time T by delay device 30 which is, for example, a shift register clocked synchronously with the digitized FM INPUT digital data sample stream. The delay time T is selected to delay the digital samples for an interval corresponding to approximately a 90° phase shift at the FM carrier signal nominal frequency, or to an odd-multiple thereof.

Digital adder 32 develops a sum digital signal by summing the respective values of the undelayed and of the delayed digital FM INPUT signals. Digital absolute value circuit 34 develops digital signals representing the absolute values of the digital sum signals and applies them to digital peak detector circuit 36 which provides digital signals representative of the peak values of the absolute values of the sum signals. Absolute value circuit 34 can, for example, be a digital full-wave rectifier circuit or can simply delete the sign bit in the case of symmetrical digital signals.

One satisfactory arrangement for peak detector 36 is, for example, an up/down counter (not shown) which is enabled by a comparator (not shown) to increment (count up) at a high rate whenever the comparator detects that the digital signal input to peak detector 36 exceeds the value stored in the up/down counter thereby to track the rising digital input signals. When the digital signal input to peak detector 36 does not exceed the count stored in the up/down counter (not shown), the comparator (not shown) enables the up/down counter to decrement (count down) at a slower rate selected in relation to the slewing rate of the digitized signal representing the information signal modulated on the FM carrier signal. The count stored in the up/down counter is the digital signal produced by peak detector 36.

Digital combiner circuit 38, which is a digital subtractor, for example, develops a difference signal by subtracting the delayed FM INPUT signal from the undelayed FM input signal. Digital absolute value circuit 40 and peak detector 42 are the same respective types as absolute value circuit 34 and peak detector 36 described above, and develop a digital signal representing the peak values of the absolute values of the difference digital signals from combiner 38.

Digital combiner circuit 44 which is a digital subtractor, for example, develops a difference signal by subtracting the digital output signal produced by peak detector 42 from that produced by peak detector 36. This difference signal is representative of the product of the FM deviation and the carrier envelope amplitude and is applied to gain-controlled digital lowpass filter 10A. The magnitude of the filtered digital output signal from digital filter 10A represents the detected FM data, i.e. the FM deviation, owing to the manner in which the gain of digital filter 10A is controlled in response to gain control signal GC as is described below.

Digital adder 46 develops a digital sum signal which is the sum of the digital signals produced by peak detectors 36 and 42. This sum signal is representative of the envelope amplitude of the FM carrier and is applied to gain-controlled digital lowpass filter 10B which has a lowpass filtering characteristic related to that of digital filter 10A. It is also satisfactory that digital filters 10A and 10B have the same lowpass filtering characteristic. The magnitude of the filtered digital output signal ES from digital filter 10B, representing the FM carrier envelope amplitude, is applied to digital gain control circuit 50 which develops the gain control signal GC which is applied to digital filters 10A and 10B.

Digital gain control circuit 50 compares digital envelope signal ES to a reference level signal REF from reference source 52 and develops gain control signal GC to increase the gain provided by gain controlled digital filters 10A and 10B when signal REF exceeds signal ES and to develop gain control signal GC to decrease the gain thereof when ES exceeds REF. In this manner, gain control circuit 50 and gain-controlled digital lowpass filter 10B cooperate in a degenerative (negative) feedback arrangement to stabilize the level of filtered envelope signal ES.

Because digital filters 10A and 10B provide related lowpass filtering characteristics and are controlled by the same gain control signal GC, the action of gain control circuit 50 substantially reduces the effects of envelope amplitude variations on the filtered digital signals at the respective outputs of both digital filters 10A and 10B. Thus, the filtered output signal produced by digital filter 10A, which represents the product of FM deviation and envelope magnitude, is substantially free of variations caused by envelope amplitude variations and will be substantially the desired demodulated FM deviation digital signal which corresponds to the original information signal which was modulated on the FM carrier signal.

Gain controlled lowpass filters 10A and 10B and gain control circuit 50 are described in detail below in relation to FIGS. 2 and 3.

Each of digital filters 10A and 10B includes, for example, digital filter 10 shown in FIG. 2 having controllable gain. Digital filter 10 receives digital input signals IN and produces filtered digital output signals OUT. Signals IN and OUT are, for example, six to eight-bit digitized video samples in a television receiver having digital signal processing apparatus or can be twelve to sixteen-bit sound samples in a digital audio system.

Digital input signals IN are applied to a first input of digital adder 12, the output of which produces filtered digital output signals OUT. Signals OUT are applied to a delay device 14 which introduces a predetermined delay. It is preferred that delay 14 be a clocked delay such as a latch or a shift register and that it provide a delay of one period of a system clocking signal (not shown) with which the digital signals are synchronized.

The delayed filtered digital signals from delay 14 are applied to a first input (+) of digital combining device 16 and to the data input of controllable shifter 18. Controllable shifter 18 produces output digital signals which are shifted a predetermined number N of bit positions to the left (binary multiplication by $2^N$) or to the right (binary division by $2^N$ which is the same as binary multiplication by $2^{-N}$) in accordance with shifter gain control signal GC developed by gain control 50.

Digital combining circuit 16 receives the controllably shifted delayed filtered digital signals from shifter 18 at its second input (−) to produce the difference between the delayed filtered digital signals from delay device 14 and the shifted delayed filtered digital signals. The difference signal from combining circuit 16 is applied to the second input of digital adder 12 to be added to the digital input signals IN to produce the filtered output signals OUT. Combining circuit 16 can be, for example, a digital subtractor or a digital adder having a complementing circuit coupled to the input receiving signals from shifter 18 which are to be subtracted.

The operation of controllable gain digital filter 10 can be understood with the aid of the following equations. The ratio of the output to input signals (gain) is the lowpass filter transfer function given by $$\text{OUT/IN} = 1/[1-(GZ^{-1})] \qquad [1]$$

where: G is the gain factor provided by shifter 18 and combining circuit 16 in response to control signal GC, and $Z^{-1}$ represents the one clock cycle delay provided by delay device 14.

For digital signals which vary at low frequencies relative to the clocking frequency, the transfer function reduces to $$\text{OUT/IN} = 1/(1-G) \qquad [2]$$

The gain G provided by shifter 18 and combining circuit 16 is given by $$G = 1-(1/2^N) \qquad [3]$$

where: N is the number of bits positions of rightward shifting (i.e. division) provided by shifter 18 in response to control signal GC.

Substituting equation [3] into equation [2] gives $$\text{OUT/IN} = 1/\{1-[1-(1/2^N)]\} = 2^N \qquad [4]$$

showing that the gain of digital filter 10 is controllable responsive to the controllable shifting provided by shifter 18 in response to control signal GC.

Gain control 50 develops gain control signal GC to produce the required gain of digital filter 10. Preferably, control signal GC is developed at a rate much higher than that of the low frequency information included in input signal IN, for example at the rate of the clocking signals. Thus, signal GC can change more rapidly than the low frequency information of digital signals IN and so can cause digital filter 10 to exhibit effective low frequency gains which are intermediate the discrete levels which would be realized if signal GC were not so changed. This effective gain is equal to the reciprocal of the average of the division factors $2^{-N}$ provided by shifter 18.

For example, a gain of $2^4 = 16$ is provided by digital filter 10 when shifter 18 provides a four-position rightward shift, and a gain of $2^5 = 32$ is provided when shifter 18 provides a five-position rightward shift. Where control signals GC controls shifter 18 to provide alternating four- and five- position rightward shifts at the clocking rate at which digital input signals IN are received, an effective (i.e. "average") gain of approximately $1/\{(1/2)[(1/16)+(1/32)]\} = 21.33$ is provided. Where the five-position shift is provided, for example, for one of every five digital input samples and four-position shifts are provided for the four intermediate samples thereof, the average gain provided is approximately $$1/\{(1/5)[(1/32)+(1/16)+(1/16)+(1/16)+(1/16)]\} = 17.78.$$

Therefore, a controllable gain is provided when shifter 18 is controlled by gain control signal GC developed by gain control 50 in a time varying fashion to, in effect, time multiplex the instantaneous gain exhibited by filter 10 to produce an average thereof with respect to the low frequency information contained in the input digital signals IN.

FIG. 3 shows an embodiment of gain control circuit 50 in which the level of the digital output signals OUT from controllable-gain lowpass digital filter 10 are controlled to be at a predetermined average reference level REF. Signal OUT here is signal ES, for example. Digital comparator 54 receives the output signals OUT at its input A and the reference level signal REF at its input B. Comparator 54 produces comparison signal A>B when the level of signal OUT exceeds that of REF and produces comparison signal A<B when the level of signal REF exceeds that of OUT.

Coder 58 responds to the A>B signal to apply a down-count control level to the up/down control input U/D of digital up/down counter 60 to enable it to count down. Gate 56 responds to the presence of the A>B signal to apply clocking signal CLK to the clocking input C of counter 60 causing it to decrement (count down). The outputs of the registers of counter 60 form a parallel digital word which is employed as the control signal GC. Decrementing counter 60 reduces the value indicated by control signal GC which decreases the number of rightward shifts (decreases the division) provided by shifter 18 to thereby decrease the gain exhibited by digital filter 10, whereby the level of output signal OUT will tend to be reduced and approach the level REF.

Conversely, coder 58 responds to the A<B comparison signal to enable up/down counter 60 to count up and gate 56 responds thereto to apply clocking signals CLK to counter 60 causing it to increment. Incrementing counter 60 increases the value of control signal GC to increase the shifting by shifter 18 and the gain exhibited by digital filter 10, whereby the level of output signal OUT tends to be increased and approach the level REF. It is noted that when OUT and REF are equal, comparator 54 produces neither of comparison signals A>B and A<B so that gate 56 does not apply clocking signal CLK to counter 60.

Modifications are contemplated to be within the scope of the present invention which is limited only by the claims following. For example, the FM ratio detector of FIG. 1 as described includes absolute value circuits 34, 40 and peak detectors 36, 42 which effectively full-wave rectify the digital signals thereby to double the frequencies of the components thereof to provide twice as many peak detections. This also beneficially eases the design of the digital lowpass filters 10A, 10B. It is contemplated that absolute value circuits 34, 40 can be removed and that signals from adder 32 and combiner 38 be applied directly to peak detectors 36, 42.

It is further contemplated that peak detectors 36, 42 can have a delayed response in two respects: (1) that the detectors will be slower in rise time than is the input digital signal applied thereto, and (2) that the detectors delay slightly detection of a peak by allowing the input signal to decrease slightly before the peak value is held. These limits have similar effects to those introduced by resistances in series with the diodes used in analog peak detectors.

A particular embodiment of shifter 18 of digital filter 10 employs a multiplexer to select various bits of an input digital word to be shifted to be in different bit positions of the shifted output digital word as is described, for example, in U.S. patent application Ser. No. 488,594 entitled DIGITAL LOWPASS FILTER HAVING CONTROLLABLE GAIN filed by C. B. Dieterich on even date herewith and which is incorporated herein by reference.

In addition, the frequency modulation of signals specifically described herein includes related modulation techniques, for example, phase modulation, with appropriate filtering of the digital signals produced by digital filter 10A. Moreover, many forms of information signals are satisfactorily detected in accordance with the present invention. These information signals include but are not limited to linear signals, FSK signals, or encoded signals.

Other gain control circuits 50 can also be used such as a flip-flop which receives set and reset inputs so as to change the value of its output, which is gain control signal GC, between two gain states. Alternatively, the flip-flop can be a D-type flip-flop to which a bit stream representing a time varying gain sequence is applied at its data "D" input.

What is claimed is:

1. A digital detector for producing digital output signals representing information signals in response to digital input signals representing said information signals frequency modulated on a carrier signal comprising:
    means responsive to said digital input signals for producing first and second detected digital signals, said first detected digital signals representing the envelope of said carrier signal, and said second detected digital signals representing the product of the frequency modulation and the envelope of said carrier signal;
    a first digital filter having controllable gain for producing first filtered digital signals in response to said first detected digital signals, said controllable gain of said first digital filter being controlled in response to a control signal;
    a second digital filter having controllable gain for producing second filtered digital signals in response to said second detected digital signals, said controllable gain of said second digital filter being controlled in response to said control signal; and
    control means for developing said control signal in response to one of said first and second detected digital signals and for applying said control signal to said first and second digital filters to control the respective gains thereof,
    wherein one of said first and second filtered digital signals is supplied as said digital output signals.

2. The digital detector of claim 1 wherein said control means comprises:
    a source of a reference signal;
    comparison means to which said reference signal and a further digital signal responsive to said one of said first and second detected digital signals are applied for developing an indication of the relative levels thereof; and
    means responsive to said indication for developing said control signal.

3. The digital detector of claim 2 wherein said means responsive to said indication develops said control signal for increasing the gains of said first and second digital filters when said reference signal exceeds said further digital signal and for decreasing the gains thereof when said further digital signals exceeds said reference signal.

4. The digital detector of claim 1 wherein said control means varies said control signal at a rate proportional to the sample rate of said input digital signals.

5. The digital detector of claim 1 wherein said control signal alternates periodically between first and second values corresponding to first and second gains of said first and second digital filters so that said first and second filtered digital signals are modified with respect to said first and second detected digital signals by an effective gain related to the relative times that said first and second values of said control signal are produced.

6. A digital detector for producing digital output signals representing deviations of the frequency of a carrier signal in response to digital input signals representing information signals frequency or phase modulated on said carrier signal comprising:

means responsive to said digital input signals for producing first and second detected digital signals, said first detected digital signals representing the envelope of said carrier signal, and said second detected digital signals representing the product of said deviations and said envelope;

a first digital lowpass filter having controllable gain for producing first filtered digital signals in response to said first detected digital signals, said controllable gain of said first digital lowpass filter being controlled in response to a control signal;

a second digital lowpass filter having controllable gain for producing second filtered digital signals in response to said second detected digital signals, said controllable gain of said second digital lowpass filter being controlled in response to said control signal, wherein said second filtered digital signals are supplied as said digital output signals; and control means for developing said control signal in response to said first filtered digital signals and for applying said control signal to said first and second digital filters to control the respective gains thereof.

7. The digital detector of claim 6 wherein said control means comprises:

a source of a reference signal;

comparison means to which said reference signal and said first filtered digital signals are applied for developing an indication of the relative levels thereof; and means responsive to said indication for developing said control signal.

8. The digital detector of claim 7 wherein said means responsive to said indication develops said control signal for increasing the gains of said first and second digital lowpass filters when said reference signal exceeds said first filtered digital signals and for decreasing the gains thereof when said first filtered digital signals exceed said reference signal.

9. The digital detector of claim 6 wherein said control means varies said control signal at a rate proportional to the sample rate of said input digital signals.

10. The digital detector of claim 6 wherein said control signal alternates periodically between first and second values corresponding to first and second gains of said first and second digital filters so that said first and second filtered digital signals are modified with respect to said first and second detected digital signals by an effective gain related to the relative times that said first and second values of said control signal are produced.

11. A digital detector comprising:

a source of digital input signals representing information signals frequency modulated on a carrier signal;

digital delaying means to which said digital input signals are applied for producing delayed digital input signals;

first adding means receiving said digital input signals and said delayed digital input signals for producing first digital signals representing the sum thereof;

first combining means receiving said digital input signals and said delayed digital input signals for producing second digital signals representing the difference thereof;

detecting means coupled to said first adding means and said first combining means and to which said first and second digital signals are applied, for producing third and fourth digital signals responsive to the peak values of said first and second digital signals, respectively;

second adding means receiving said third and fourth digital signals for producing first detected digital signals representing the sum thereof;

second combining means receiving said third and fourth digital signals for producing second detected digital signals representing the difference thereof;

a first digital lowpass filter having controllable gain and coupled to said second adding means, for producing first filtered digital signals from said first detected digital signals, said controllable gain of said first digital lowpass filter being controlled in response to a control signal;

a second digital lowpass filter having controllable gain and coupled to said second combining means, for producing second filtered digital signals from said second detected digital signals, said controllable gain of said second digital lowpass filter being controlled in response to said control signal; and control means for developing said control signal in response to said first filtered digital signals and for applying said control signal to said first and second digital filters to control the respective gains thereof.

12. The digital detector of claim 11 wherein said control means comprises:

a source of a reference signal;

comparison means to which said reference signal and said first filtered digital signals are applied for developing an indication of the relative levels thereof; and means responsive to said indication for developing said control signal.

13. The digital detector of claim 12 wherein said means responsive to said indication develops said control signal for increasing the gains of said first and second digital lowpass filters when said reference signal exceeds said first filtered digital signals and for decreasing the gains thereof when said first filtered digital signals exceed said reference signal.

14. The digital detector of claim 11 wherein said detecting means includes absolute valuing means receiving said first and second digital signals for producing first and second digital magnitude signals representing the absolute values of said first and second digital signals, respectively, said detecting means producing said third and fourth digital signals in response to the peak values of said first and second digital magnitude signals, respectively.

15. The digital detector of claim 11 wherein said control means varies said control signal at rates proportional to the sample rate of said input digital signals.

16. The digital detector of claim 11 wherein said control signal alternates periodically between first and second values corresponding to first and second gains of said first and second digital filters so that said first and second filtered digital signals are modified with respect to said first and second detected digital signals by an effective gain related to the relative times that said first and second values of said control signal are produced.

17. A digital detector comprising:
- a source of digital input signals representing information signals frequency modulated on a carrier signal;
- digital delaying means to which said digital input signals are applied for producing delayed digital input signals;
- first adding means receiving said digital input signals and said delayed digital input signals for producing first digital signals representing the sum thereof;
- first combining means receiving said digital input signals and said delayed digital input signals for producing second digital signals representing the difference thereof;
- detecting means to which said first and second digital signals are applied for producing third and fourth digital signals responsive to the peak values of said first and second digital signals, respectively;
- second adding means receiving said third and fourth digital signals for producing first detected digital signals representing the sum thereof;
- second combining means receiving said third and fourth digital signals for producing second detected digital signals representing the difference thereof;
- first and second digital filters having controllable gain for producing first and second filtered digital signals in response to said first and second detected digital signals, respectively, each of said first and second digital filters comprising:
  - third adding means having a first input for applying said detected digital signal, having a second input, and having an output for producing thereat said filtered digital signals;
  - second delaying means, to which the output of said third adding means is coupled, for delaying said filtered digital signals;
  - shifting means, to which said delaying means is coupled and responsive to a control signal, for controllably shifting said delayed filtered digital signals;
  - third combining means, to which said delaying means and said shifting means are coupled, having an output for producing thereat the difference of said delayed filtered digital signals and said shifted and delayed filtered digital signals, the output of said third combining means being coupled to the second input of said third adding means for applying said difference digital signals produced by said third combining means thereto; and
- control means for developing said control signal, and for applying said control signal to said shifting means of each of said first and second digital filters to control the respective gains of said digital filters.

18. The digital detector of claim 17 wherein said control means varies said control signal at rates proportional to the sample rate of said detected digital signals.

19. The digital detector of claim 17 wherein said control means comprises:
- a source of a reference signal;
- comparison means to which said reference signal and said filtered digital signals produced by said first digital filter are applied for developing an indication of the relative levels thereof; and
- means responsive to said indication for developing said control signal.

20. The digital detector of claim 19 wherein said means responsive to said indication develops said control signal for controlling said shifting means of each of said first and second digital filters to cause said shifting means to divide said delayed filtered digital signals by increasingly greater factors when said reference signal exceeds said filtered digital signals produced by said first digital filter and to cause said shifting means to divide said delayed filtered digital signals smaller factors when said filtered digital signals produced by said first digital filter exceed said reference signal.

21. The digital detector of claim 17 wherein said control signal alternates periodically between first and second values corresponding to first and second gains of said first and second digital filters so that said first and second filtered digital signals are modified with respect to said first and second detected digital signals by an effective gain related to the relative times that said first and second values of said control signals are produced.

22. The digital detector of claim 17 wherein said detecting means includes absolute valuing means receiving said first and second digital signals for producing first and second digital magnitude signals representing the absolute values of said first and second digital signals, respectively, said detecting means producing said third and fourth digital signals in response to the peak values of said first and second digital magnitude signals, respectively.

* * * * *